Jan. 21, 1964 D. EIGEN ETAL 3,119,066

RECEIVERS FOR THE RECEPTION OF ELECTROMAGNETIC
WAVES OF ANY DESIRED FREQUENCY
Original Filed March 16, 1959

INVENTORS
DAVID EIGEN
ROBERT W. PEER
BY James G. Bechell
ATTORNEY

United States Patent Office 3,119,066
Patented Jan. 21, 1964

3,119,066

RECEIVERS FOR THE RECEPTION OF ELECTROMAGNETIC WAVES OF ANY DESIRED FREQUENCY

David Eigen, Passaic, and Albert W. Peer, Kinnelon, N.J., assignors to The Okonite Company, Passaic, N.J., a corporation of Delaware Original application Mar. 16, 1959, Ser. No. 799,791, now Patent No. 3,032,652, dated May 1, 1962. Divided and this application Feb. 5, 1962, Ser. No. 171,118
6 Claims. (Cl. 325—476)

Our invention relates to receivers for the reception of electromagnetic impulses of any frequency. Receivers of this general type are commonly used in the reception of amplitude-modulated radio, television, and similar signals transmitted through the atmosphere or through space outside the atmosphere from a source relatively remote from the receiving apparatus.

Existing apparatus for the reception of such signals, hereinafter referred to as "desired signals," also pick up undesired electromagnetic impulses, hereinafter referred to as "noise." If the ratio of the strength of pickup of the desired signal to the strength of pickup of noise is high, the desired signal can be clearly recorded, displayed, heard, seen, or otherwise made to be understood, or can be used faultlessly, when sufficiently amplified, rectified, and fed into the proper transducer, to operate control mechanisms. Such a signal is said to be of high quality. On the other hand, if the ratio of the desired signal to noise is low, amplification does not increase the clarity of the desired signal in that, when the desired signal is amplified, the noise is also amplified in an equal ratio. Under these conditions, understanding of the desired signal is difficult or impossible, and when such deserved signals are used to operate control or metering mechanisms, they often give faulty operations. Such signals are said to be of low quality.

An object of our invention is to provide means whereby the effects of noise emanating from without the receiver will be substantially cancelled before reaching the transducer, thus leaving a clear, high-quality desired signal for operating the transducer.

A further object of our invention is to provide means within the receiver whereby a high ratio of desired signal to noise from a low-quality signal pickup is attained, thereby permitting great amplification while attaining high quality of the desired signal for actuation of the transducer.

A further characteristic inherent in our receiver is its ability satisfactorily to receive weak signals, even under conditions where noise signals are predominant, thereby permitting greater distance of signal transmission with the same power.

A still further object of our invention is to provide a receiving apparatus which will permit satisfactory communications even when atmospheric noise conditions are so severe as otherwise to render the transmission ineffective.

Another object of our invention is to provide a receiver which will greatly increase reliability of operation of metering and control mechanisms and other intelligence transmission apparatus for space missiles and space exploration devices and permit the use of lower-power and, hence, lighter-weight transmitters in such devices.

Figures 1, 3, 4, 5:
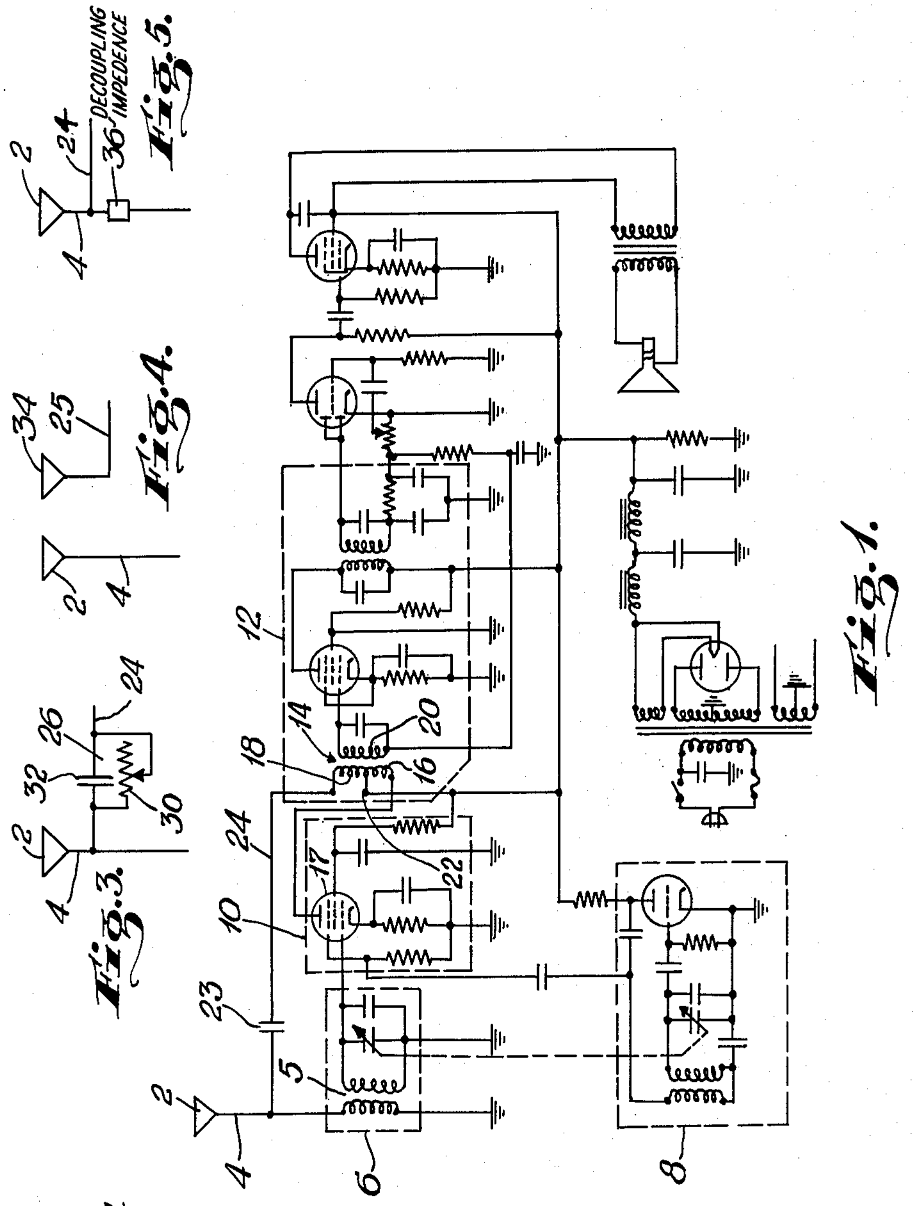
Figure 2:
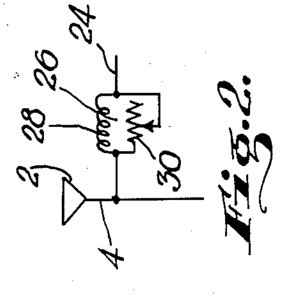

In the accompanying drawings,

FIG. 1, which includes a typical wiring diagram of a simplified superheterodyne circuit, illustrates one embodiment of our invention; and FIGS. 2, 3, 4, and 5 are diagrammatic showings of further embodiments of our invention as applied to the showing in FIG. 1.

In the superheterodyne principle of reception the modulated carrier wave of the desired signal is first changed into a predetermined intermediate frequency; then the desired signal at this predetermined intermediate frequency is amplified, rectified, and transduced, or it may be further amplified after rectification and then transduced.

In the United States and elsewhere there are frequencies on which there is no broadcasting, and under the superheterodyne principle of reception the carrier wave of the desired signal is changed to an intermediate frequency, which may be chosen to be one of these broadcast-free frequencies. In conventional superheterodyne radio receivers the carrier wave of the desired broadcast signal is converted into 455 kc., for example, and the converted signal is then amplified and detected. Television and other communication media similarly use other intermediate-frequency bands.

One advantage of the superheterodyne principle is that the amplifiers of a superheterodyne receiver can be permanently adjusted to respond to an intermediate frequency so as to amplify, at this single frequency, a desired signal which is being broadcast at any one of the many different broadcast frequencies. Such amplification is accomplished without the various amplification stages of the receiver having to be adjusted to change reception from one broadcast frequency to another. The one tuning knob of a superheterodyne receiver controls the tuning circuit of the receiver to respond to the frequency of the desired modulated sine wave carrier signal. This knob also simultaneously controls a local oscillator, which is in continual oscillation at a frequency of 455 kc., for example, either above or below the frequency to which the tuning circuit is adjusted to respond. The modulated signal from the tuning circuit and the oscillation signal from the local oscillator are both fed into a mixer tube, where the modulated sine waves of the desired signal and the unmodulated sine wave from the oscillator are mixed. These two frequencies, as well as frequencies representing the sum of and the difference in frequency of the two signals appear at the plate of the mixer. The following stages of amplification are all tuned to 455 kc., for example, or other intermediate frequency, so that this frequency is accepted by the equipment, amplified, detected, and used to actuate the transducing means. All other frequencies cause no response in the intermediate-frequency part of the circuit and can be said to be rejected.

While the superheterodyne receiver was a big step forward in reception of electromagnetic waves, even such a receiver picks up noise impulses, as above explained, which are mixed with and undesirably further amplitude-modulate the frequency leaving the tuning circuit. This undesirable modulation is carried through the mixer tube into the intermediate-frequency components of the receiver and often obscures the desired signals reaching the transducer.

We have found that these various undesired electromagnetic impulses are of a very random nature and contain energy components which will shock a resonant circuit into oscillation, even though the resonant circuit may be tuned to only a specific single frequency. We have found also that oscillation can be initiated with approximately equal vigor by the same noise impulse and can be made to decay at the same rate, even though each of two separate resonant circuits may be tuned to specific frequencies widely spaced from each other.

Our invention utilizes these findings to neutralize the undesirable part of the modulation of the desired signal by providing the intermediate-frequency components of the receiver with a second path through which the noise impulses may be introduced to cause modulation of the desired signal, in opposition to modulation caused by noise impulses entering the receiver through the normal path. This second path contains means to provide 180-degree phase displacement from the normal path. The second-path noise impulse modulations being 180 degrees phase-displaced from and of approximately the same vigor as the normal-path noise impulse modulations, the noise impulse modulations entering the receiver via one path and those entering the receiver via the other path neutralize each other, leaving a correctly modulated desired signal.

Referring to the drawings in detail,

FIG. 1 shows a schematic wiring diagram of a superheterodyne circuit as modified by our invention, 2 designating the antenna and 4 the antenna lead. For simplicity and clarity, the tuning circuit, the local oscillator, the mixer circuit including the mixer tube, and the intermediate-frequency components have been enclosed in dotted lines and designated 6, 8, 10, and 12, respectively. The other elements of the receiver, such as detector, audio amplifier, transducer, and power supply are shown by typical conventional symbols but not further identified, as they are widely understood by those skilled in this art.

In this embodiment of our invention we have provided one of the elements of the intermediate-frequency components 12, viz, transformer 14, with two identical and closely coupled, preferably bifilar wound, primary windings 16 and 18. 20 designates the usual secondary winding of the transformer, this winding being conventionally coupled to the primary windings. One end of the primary winding 16, as seen in FIG. 1, is connected to the plate of a mixer tube 17 and its opposite end to junction 22, to which is also connected the source of plate supply voltage and A.-C. ground, as shown. One end of the other primary winding 18 of the transformer 14 is connected to lead 4 of the antenna 2 by means of a lead 24, while the opposite end of the primary winding is connected to the junction 22. An isolating capacitor 23 is inserted in the lead 24 between primary winding 18 and the junction of lead 24 with antenna lead 4.

As will be seen from the drawing, the connection of primary winding 16 to the plate of mixer tube 17 and the connection of primary winding 18 to the antenna lead 4 are so chosen that an impulse entering primary winding 16 at that end which is connected to the plate of the mixer tube 17 and proceeding through the winding to the junction 22, and the same impulse entering winding 18 at that end which is connected to the antenna lead 4 and proceeding through the winding to the junction 22 will tend to set up magnetic fields of opposite polarity in the transformer 14; therefore, identical and in-phase impulses simultaneously entering primary winding 16 and primary winding 18 will exactly cancel each other, so that no electrical impulse therefrom will be imposed on the secondary winding 20 of the transformer.

It will be appreciated that the desired signal enters the receiver through the antenna 2 and proceeds through antenna lead 4 and the tuning circuit 6, which includes tuning coil 5, and, as explained earlier, there are undesired amplitude modulations of the tuned waves of energy leaving the tuning circuit due to noise impulses. The desired modulated signal with the additional undesired modulation just mentioned is mixed in the mixer circuit 10 with the frequency emanating from the local oscillator 8.

As previously pointed out, the transformer 14 and its associated intermediate-frequency components 12 accept only the predetermined intermediate frequency, the other frequencies emanating from the mixer circuit causing no response in the intermediate-frequency components 12. It will be appreciated, therefore, that our invention distinguishes from conventional receivers, where the transformer 14 has only one primary winding, and the responses in the intermediate-frequency components 12 are undesirably amplitude-modulated by the noise impulses transmitted to the components 12 through the mixer circuit 10, tuning circuit 6, antenna lead 4, and antenna 2.

To overcome the undesirable part of the modulation of the 455 kc. or other broadcast-free frequency, we provide the transformer 14 with the additional primary winding 18, connected as above explained, through which the noise impulse at the random frequency is introduced into the transformer.

Since there are no broadcasts at the selected intermediate frequency, it will be appreciated that only those components of the noise impulses which will shock the selected intermediate-frequency resonant circuit into oscillation will be accepted and cause response in the intermediate-frequency components 12. However, any such response is in phase opposition to the response of components 12 caused by the same impulse entering the primary winding 16. Therefore, the resultant responses of components 12 are due only to the mismatch of phase angle and intensity of such impulses entering the transformer 14 through the two primary windings.

We have found that with simple circuits the lead 24 can be generally connected directly from the winding 18 to the antenna lead 4 through the isolating capacitor 23, so that with a properly constructed transformer 14 the mismatch of phase angle or intensity of impulses due to noise is so slight as to be negligible, practically all noise being cancelled.

However, to provide for applications of the cancellation of signal in circuits where the above arrangement would not be adequate, or to provide finer adjustment of the cancellation, or to compensate for transformer inaccuracies, we may employ a phase-shifter 26 (see FIG. 2) in the lead 24 to adjust electrical constants of the lead 24, so that the phase angle and intensity of the 455 kc. or other intermediate-frequency components of the noise impulse reaching the transformer secondary winding 20 through the primary winding 18 will be of exact proportion to cancel that reaching secondary winding 20 through primary winding 16. The phase-shifter 26 may take many forms, all of which are contemplated. In the form illustrated in FIG. 2 we provide an inductance 28, shunted by a resistor 30. The inductance 28 may be fixed and the resistor adjustable, as shown, or vice versa. In the phase-shifter illustrated in FIG. 3 we provide a condenser 32, shunted by a resistor 30. The condenser may be fixed and the resistor adjustable, as shown, or vice versa. Any of these arrangements, it will be appreciated, permit adjustment of phase angle and intensity of the impulses flowing along the lead 24 to the transformer 14.

In those applications of our principle to circuits where the various adjustments of the tuning circuit to select broadcast signals of different frequencies cause intolerable interaction between the tuning circuit 6 and the transformer 14 along the antenna lead 4 and the lead 24, said interaction can be eliminated by the arrangement shown in FIG. 4, wherein the lead 4 of antenna 2 is only connected to the tuning coil 5 and we provide an antenna 34 in addition to the conventional antenna 2. This additional antenna 34 is connected by lead 25 to the primary winding 18 of the transformer 14. It is important that the antenna 2 and antenna 34 be similarly oriented in order that they similarly respond to noise impulses originating from the same direction. It is not necessary, however, that the two antennas be the same in size, as amplification or attenuation can be accomplished within the receiver by the means indicated herein or by other well known means. A slight physical separation of the two antennas effectively decouples the antennas and thereby prevents interaction between the tuning circuit 6 and transformer 14 along the antenna lead 4 and lead 24. Alternatively, as shown in FIG. 5, this interaction can be adequately prevented by placing a decoupling impedance 36 in the antenna lead 4 between the tuning circuit 6 and the junction of lead 24 with antenna lead 4. This decoupling impedance 36 can be a resistance or an inductance or a capacitance or a combination of these elements, as convenience or economy dictates.

It is to be understood that the use of the phase-shifter 26 is not to be confined to the single-antenna arrangement illustrated, but it can be used in conjunction with the dual-antenna arrangement shown in FIG. 4. It is also to be understood that both the phase-shifter 26 and the decoupling impedance 36 may be used in connection with a single antenna in the practice of our invention.

From the foregoing it will be appreciated that we have provided means to supply intermediate-frequency oscillations which are amplitude-modulated only by the desired signal and are free of all undesired modulations. When these modulated oscillations are further amplified, detected, and transduced, a clear, clean, high-quality response of the transducer can be attained, regardless of severity of the noise signals in the atmosphere or in the vicinity. The transducing means may, of course, be any of the conventional visual, audio, or recording devices, or may be a mechanical device for initiating action, for example a valve closer, cam adjuster, or plunger actuator, etc.

As can be noted from FIG. 1, circuits in accordance with our invention require only one knob to tune the set.

While we have shown the opposing noise signal introduced at the first intermediate-frequency stage, it will be appreciated that the opposing noise signal may be introduced, prior to detection, at any desired later stage of amplification. However, such later introduction complicates to some extent the exactness of equipment required for perfect cancelling of unwanted noise. Then, too, the introduction of the opposing noise signal at the earliest possible position keeps to a minimum the additional equipment required. Introduction of the opposing noise signal at the earliest possible position makes unnecessary the useless amplifying of undesired signals, thereby reducing load on succeeding amplifiers and other components and/or permitting greater output of the desired signal per stage of amplification.

It is common practice in more intricate superheterodyne circuits to use one or more stages of pre-amplification before conversion to the intermediate frequency. In such receivers we contemplate that suitable pre-amplification will also be introduced into the lead 24.

It is to be understood that, while the transformer 14 has been shown with the secondary winding 20, this winding may be eliminated by connecting the two leads of this secondary to the ends of primary windings 16 and 18.

As above noted, our receiver is usable for radio, television, telemetering, or other intelligence, or remote-control applications where the signal must be transmitted through air or through space outside the atmosphere, and since weak signals can be satisfactorily separated from high levels of noise impulses, it will be appreciated that, on receivers within space missiles and other devices, the receivers will correctly actuate the control devices from ground signals which would not otherwise be of satisfactory quality. Conversely, the transmitters carried by such devices can be of smaller power and lighter weight if our receiver is employed on the ground to receive signals from the missiles.

It is to be understood that changes may be made in the details of construction and arrangement of parts hereinabove disclosed within the purview of our invention.

This application is a division of our copending application Serial No. 799,791, filed March 16, 1959, now Patent No. 3,032,652, Receivers for the Reception of Electromagnetic Waves of Any Desired Frequency.

What we claim is:

1. A receiver for the reception of electromagnetic waves of any desired frequency, said receiver comprising a tuning coil; a local oscillator; a mixer circuit, including a mixer tube; and an interstage tuned to an intermediate frequency, including a transformer having two primary windings; said local oscillator and said tuning coil being connected to the input of said mixer tube; said tuning coil and one end of one winding of the said transformer being connected to an antenna for the receiver; one end of the other primary winding of the transformer being connected to the plate of the mixer tube of the mixer circuit; the other ends of the two transformer primary windings having a common junction; the connections of the transformer windings being so chosen that the only electrical impulses affecting the secondary of the transformer are those impulses of said intermediate frequency appearing in the second-mentioned primary winding modified by those impulses of said intermediate frequency appearing in the first-mentioned primary winding.

2. A receiver for the reception of electromagnetic waves of any desired frequency, said receiver comprising a tuning coil; a local oscillator; a mixer circuit, including a mixer tube; an interstage, tuned to an intermediate frequency, including a transformer having two primary windings, said local oscillator and said tuning coil being connected to the input of said mixer tube; an antenna to which said tuning coil and one end of one winding of the said transformer are connected, one end of the other primary winding of the transformer being connected to the plate of the said mixer tube, the other ends of the two transformer primary windings having a common junction, the connections of the transformer windings being such that the only electrical impulses affecting the secondary of the transformer are those impulses of said intermediate frequency appearing in the second-mentioned primary winding, modified by those impulses of said intermediate frequency appearing in the first-mentioned primary winding; and an adjustable phase-shifter in the lead connecting one end of said transformer to said antenna.

3. A receiver for the reception of electromagnetic waves of any desired frequency, said receiver comprising a tuning coil; a local oscillator; a mixer circuit, including a mixer tube; an interstage, tuned to an intermediate frequency, including a transformer having two primary windings, said local oscillator and said tuning coil being connected to the input of said mixer tube; an antenna to which said tuning coil and one end of one winding of the said transformer are connected, one end of the other primary winding of the transformer being connected to the plate of the said mixer tube, the other ends of the two transformer primary windings having a common junction, the connections of the transformer windings being such that the only electrical impulses affecting the secondary of the transformer are those impulses of said intermediate frequency appearing in the second-mentioned primary winding, modified by those impulses of said intermediate frequency appearing in the first-mentioned primary winding; and a phase-shifter in the lead connecting one end of said transformer winding to said antenna, said phase-shifter comprising an inductance shunted by a resistor, one of said elements of the phase-shifter being adjustable.

4. A receiver for the reception of electromagnetic waves of any desired frequency, said receiver comprising a tuning coil; a local oscillator; a mixer circuit, including a mixer tube; an interstage, tuned to an intermediate frequency, including a transformer having two primary windings, said local oscillator and said tuning coil being connected to the input of said mixer tube; an antenna to which said tuning coil and one end of one winding of the said transformer are connected, one end of the other primary winding of the transformer being connected to the plate of the said mixer tube, the other ends of the two transformer primary windings having a common junction, the connections of the transformer windings being such that the only electrical impulses affecting the secondary of the transformer are those impulses of said intermediate frequency appearing in the second-mentioned primary winding, modified by those impulses of said intermediate frequency appearing in the first-mentioned primary winding; and a phase-shifter in the lead connecting one end of said transformer winding to said antenna, said phase-shifter comprising a condenser shunted by a resistor, one of said elements of the phase-shifter being adjustable.

5. A receiver for the reception of electromagnetic waves of any desired frequency, said receiver comprising a tuning coil; a local oscillator; a mixer circuit, including a mixer tube; an interstage, tuned to an intermediate frequency, including a transformer having two primary windings, said local oscillator and said tuning coil being connected to the input of said mixer tube; an antenna connected to said tuning coil; a second antenna oriented similarly to the first-mentioned antenna, said second-mentioned antenna being connected to one end of one winding of said transformer, one end of the other winding of the trasformer being connected to the plate of the mixer tube, the other ends of the two transformer primary windings having a common junction, the connections of the transformer windings being such that the only electrical impulses affecting the secondary of the transformer are those impulses of said intermediate frequency appearing in the second-mentioned primary winding, modified by those impulses of said intermediate frequency appearing in the first-mentioned primary winding.

6. A receiver for the reception of electromagnetic waves of any desired frequency, said receiver comprising a tuning coil; a local oscillator; a mixer circuit, including a mixer tube; an interstage, tuned to an intermediate frequency, including a transformer having two primary windings, said local oscillator and said tuning coil being connected to the input of said mixer tube; an antenna to which said tuning coil and one end of one winding of the said transformer are connected; and a decoupling impedance in the lead connecting the antenna to the tuning coil, one end of the other primary winding of the transformer being connected to the plate of the said mixer tube, the other ends of the two transformer primary windings having a common junction, the connections of the transformer windings being such that the only electrical impulses affecting the secondary of the transformer are those impulses of said intermediate frequency appearing in the second-mentioned primary winding, modified by those impulses of said intermediate frequency appearing in the first-mentioned primary winding.

References Cited in the file of this patent

UNITED STATES PATENTS

| | | |
|---|---|---|
| 1,590,635 | McCaa | June 29, 1926 |
| 2,000,142 | Loewenstein | May 7, 1935 |
| 2,101,529 | Breedlove | Dec. 7, 1937 |
| 2,227,415 | Wolff | Dec. 31, 1940 |
| 2,791,686 | Lambert | May 7, 1957 |

UNITED STATES PATENT OFFICE
CERTIFICATE OF CORRECTION

Patent No. 3,119,066 January 21, 1964

David Eigen et al.

It is hereby certified that error appears in the above numbered patent requiring correction and that the said Letters Patent should read as corrected below.

In the grant, line 1, and in the heading to the printed specification, line 5, name of inventor for "Albert W. Peer" each occurrence, read -- Robert W. Peer --; column 1, line 33, for "deserved" read -- desired --.

Signed and sealed this 7th day of July 1964.

(SEAL)
Attest:

ERNEST W. SWIDER
Attesting Officer

EDWARD J. BRENNER
Commissioner of Patents